United States Patent [19]
Ishii et al.

[11] Patent Number: 5,099,375
[45] Date of Patent: Mar. 24, 1992

[54] FOUR READ AND WRITE HEADS ON A DRUM ARRANGED TO PREVENT OVERLAPPING OF TRACING PERIODS

[75] Inventors: Toshiji Ishii, Nara; Yukihiko Haikawa, Hiroshima, both of Japan

[73] Assignee: Sharp Kabushiki Kaisha, Osaka, Japan

[21] Appl. No.: 470,150

[22] Filed: Jan. 25, 1990

[30] Foreign Application Priority Data

Feb. 1, 1989 [JP] Japan .................................. 1-24466

[51] Int. Cl.$^5$ ........................... G11B 5/53; G11B 5/52
[52] U.S. Cl. ........................................ 360/107; 360/84
[58] Field of Search ............... 360/107, 84, 85, 95, 360/130.22, 130.23, 130.24, 108, 124

[56] References Cited

U.S. PATENT DOCUMENTS

| | | | |
|---|---|---|---|
| 3,330,033 | 7/1967 | Manders et al. | 360/107 |
| 4,040,110 | 8/1977 | Bagby | 360/107 |
| 4,163,262 | 7/1979 | Kaemmerer | 360/107 |
| 4,520,405 | 5/1985 | Sasaki et al. | 360/84 |
| 4,524,402 | 6/1985 | Ueda et al. | 360/84 |
| 4,603,360 | 7/1986 | Fujiki et al. | 360/84 |
| 4,642,711 | 2/1987 | Yunoki et al. | 360/84 |
| 4,821,132 | 4/1989 | Hasegawa | 360/107 |
| 4,930,031 | 5/1990 | Nagahara et al. | 360/107 |
| 4,939,605 | 7/1990 | Heitmann et al. | 360/14.1 |
| 5,018,036 | 5/1991 | Yamashita | 360/107 |

*Primary Examiner*—John H. Wolff
*Assistant Examiner*—Craig A. Renner

[57] ABSTRACT

A rotary drum magnetic storage apparatus as four magnetic heads fixed above the periphery of the drum. Two of the heads are read heads and the other two heads are write heads. A magnetic tape contacts the periphery of the drum at a specific contact angle. The rotary drum of the magnetic head is of the small type that is less than 30 mm. To avoid overlapping of tracing periods of the heads of the storage apparatus during operation, there is a specific relationship fixed between the write heads, the read heads and the contact angle the magnetic tape makes with the drum.

5 Claims, 5 Drawing Sheets

FOUR READ AND WRITE HEADS ON A DRUM ARRANGED TO PREVENT OVERLAPPING OF TRACING PERIODS

BACKGROUND OF THE INVENTION

1. Field of the Invention

The present invention generally relates to magnetic storage apparatus, and more particularly, to a rotary head-type magnetic storage apparatus.

2. Description of the Prior Art

FIG. 1 is a block diagram showing an example of structure of a conventional magnetic storage apparatus. This magnetic storage apparatus is a rotary head-type digital audio tape recorder (referred to as R-DAT hereinafter) which is used as an auxiliary storage apparatus of an external computer 1. In the diagram, when data from the external computer 1 is to be written in a magnetic tape 14, it is applied to an interface 2 through a line 11. The data on the line 11 includes for example picture information, voice information, information to be processed in the external computer 1 and transmitted in information units (referred to as "frame" hereinafter) corresponding to two tracks of the magnetic tape 14 which will be described later. One frame contains, for example, 5120 bytes and the data is divided into the frames in the external computer 1 for output.

With the conventional apparatus in FIG. 1, one frame is divided into a plurality of areas as shown in FIG. 5. More specifically, for example, one frame comprises five data areas a to e and parity areas Pa to Pe individually corresponding to the data areas a to e. The above-mentioned data of 5120 bytes are divided into the data areas a to e each containing a data amount of 1024 bytes for being stored. Each of the parity areas Pa to Pe contains, for example, data of 128 bytes, which individually correspond to the data of the data areas a to e. The data in this parity areas Pa to Pe are added in the interface 2 for use as error correcting codes. In the R-DAT, parity addition is further performed in a signal processing circuit 7, where also the one frame composition shown in FIG. 5 ensures a further enhanced reliability of the R-DAT as an auxiliary storage apparatus.

The data is outputted to the signal processing circuit 7 through the interface 2 and a line 13 as well as to a random access memory 3 through the interface 2 and a line 12. The memory 3 is divided into eight memory areas M0 to M7 as shown in FIG. 3, each of which stores data of one frame.

In the memory 3, data of one frame from the interface 2 is first stored in the memory area M0. At this time, the respective data in the memory areas M0 to M6 is sequentially transmitted to the following right-hand memory areas M1 to M7 (cf. FIG.3). The data in the memory area M7 is generally deleted. For example, as shown in FIG. 3 (a), where data of frame numbers N+7 to N as will be described later are stored in the memory areas M0 to M7, respectively, when data of frame numbers N+8 and N+9 are sequentially entered, the memory 3 changes in the stored states shown in FIGS. 3 (b) and 3 (c). Input/output operation or the like at the interface 2 is performed according to a control signal from a control circuit 4 which is, for example, constituted of a microcomputer.

The parity addition in a general R-DATA is performed on the data which have been taken in the signal processing circuit 7 through the interface 2 and the line 13. The data with the added parity is outputted to an amplifier 8 through a line 14. A data signal which has been amplified by the amplifier 8 is applied to a writing head W1 through a line 15 and switched also for application to a writing head W2 through a line 16 to be written in the magnetic tape 14. The switching in the amplifier 8 is controlled by a signal from a synchronizing circuit 13 which has been synchronized with rotation of a rotating drum 9.

Such writing heads W1 and W2 and reading heads R1 and R2 as will be described later are fixed to the cylindrical rotating drum 9.

FIG. 2 is a perspective view of a structure of the rotating drum 9 and other parts associated therewith. The rotating drum 9 is driven by a motor 6 so as to rotate around its axis in the direction indicated by an arrow 20. At this time, a servo circuit 5 controls rotating speed of the motor 6 according to a control signal from the control circuit 4. Furthermore, the magnetic tape 14 is run for example by a capstan motor (not shown) in the direction indicated by an arrow 21. The magnetic tape 14 contacts a side surface of the rotating drum 9 at an angle of A1. This angle A1 is, for example, 90°.

The writing heads W1 and W2 are provided on a diameter line at side surfaces of the rotating drum 9. Similarly, the reading heads R1 and R2 are also provided on a diameter line at side surfaces of the rotating drum 9. The writing head W1 and the corresponding reading head R1 are provided with an angle A2 therebetween in the circumferential direction of the rotating drum 9 and slightly shifted with respect to each other in the axial direction. The angle A2 is, for example, 90°.

Such writing heads W1 and W2 scan on the magnetic tape 14 in a diagonal direction as shown in FIG. 4, resulting in tracks A and B. The above-mentioned frame numbers are recorded on parts of sub code areas 16a and 16b. The data having been written in the magnetic tape 14 are read out by the reading heads R1 and R2 which correspond to the writing heads W1 and W2, respectively. Signals from the reading heads R1 and R2 are applied to an amplifier 10 through lines 17 and 18, respectively. At this time, the reading heads R1 and R2 read out data on the tracks A and B, respectively, which have been formed by the corresponding writing heads W1 and W2.

The data signal which has been amplified by the amplifier 10 is outputted to a synchronizing circuit 11 through a line 19, where it is synchronized with a clock signal from a clock generating circuit 15. Meanwhile, the amplifier 10 switches, according to a synchronizing signal from the synchronizing circuit 13, the outputs from the reading heads R1 and R2 for output to the line 19. The output of the synchronizing circuit 11 is applied to a signal processing circuit 12 through a line 110, where error correction of the data is performed. This error correction is performed based on the parity which has been added in the signal processing circuit 7. The signal processing such as error correction at this stage is synchronized with that in the signal processing circuit 7 including the parity addition or the like, based on an output from the synchronizing circuit 13.

Data outputted from the signal processing circuit 12 is applied to the above-mentioned interface 2 through a line 112. Generally, the interface 2 stores the memory 3 with data through the line 12 and thereafter, reads out data from the memory 3 for output to the external computer 1.

As described above, in the conventional rotary head-type magnetic storage apparatus, the contact angle A1 of the magnetic tape 14 to the rotating drum 9 is 90° and the attaching angle A2 between a writing head and the corresponding reading head is also 90°. In this case, as shown in FIG. 6, reading may be done after writing is accomplished. With a smaller diameter of the rotating drum 9 (for example 30 mm or less), however, since the contact angle A1 of the magnetic tape 14 exceeds 90°, it is required to perform writing and reading partially at the same time (see FIG. 7) in such a conventional head arrangement as shown in FIG. 1. As a result, there has arisen a problem of crosstalk being generated (transfer of a writing signal to the reading side).

SUMMARY OF THE INVENTION

The present invention has an object to provide a magnetic storage apparatus which does not generate any crosstalk even when a rotating drum of a small diameter is used.

In the magnetic storage apparatus according to the present invention, first and second write only magnetic heads and corresponding first and second read only magnetic heads are fixed to a rotating drum to which a magnetic tape is contacted at only a predetermined angle. Alternate scanning by the first and second write only magnetic heads on the contacted magnetic tape allows writing of signals thereon. The reading-out of the written signals is effected also by alternate scanning of the first and second read only magnetic heads each of which scans on any track that has signals written thereon each time the corresponding write only magnetic head writes on a track. Now, assuming that a horizontal angle spanned alike between the first write only magnetic head and the first read only magnetic head with respect to the central axis of the rotating drum is $\theta 1$, a horizontal angle spanned alike between the first read only magnetic head and the second write only magnetic head is $\theta 2$. A horizontal angle spanned alike between the second write only magnetic head and the second read only magnetic head is $\theta 3$ and a contact angle of the magnetic tape to the rotating drum is $\alpha$, the respective magnetic, heads are arranged to meet the conditions that follow.

$\alpha \leq \theta 1, \alpha \leq \theta 2, \alpha \leq \theta 3$ $\theta 1 + \theta 2 + \theta 3 \leq 360° \times n - \alpha$ $\theta 2 \neq 180°$, (n is integer of 2 or larger)

According to the present invention, an arrangement of the magnetic heads with respect to the rotating drum which is different form the conventional type allows the rotating drum to accomplish one cycle of writing and reading by the magnetic heads, which has been hitherto done during a single rotation, with n rotations. This prevents overlap of the timings of writing and reading.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 8:
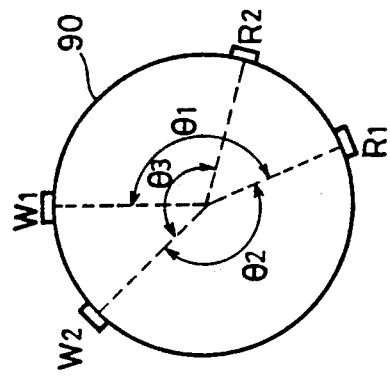
FIG. 8 is a diagram showing an arrangement relationship between a rotating drum and magnetic heads according to an embodiment of the present invention.

FIG. 8 is a diagram showing an arrangement of writing and reading heads with respect to a rotating drum in an R-DAT according to an embodiment of the present invention. In the diagram, a rotating drum 90 has been adapted to have a smaller diameter as compared with that of the rotating drum 9 (for example, 30 mm) in the conventional R-DAT shown in FIG. 1 or 2. Accordingly, the contact angle $\alpha$ of a magnetic tape to the rotating drum 90 becomes larger in comparison with that of the magnetic tape shown in FIG. 2, or A1 (=90°). Assuming now that a contact angle of a magnetic tape to a rotating drum of a 30mm diameter is 90°, the contact angle $\alpha$ of the magnetic tape to the rotating drum 90 of a $\phi$mm diameter in FIG. 8 is represented by the expression, $\alpha = 90° \times (30/\phi)$. For example, if $\phi$mm = 20mm, then $\alpha = 135°$.

Figure 7:
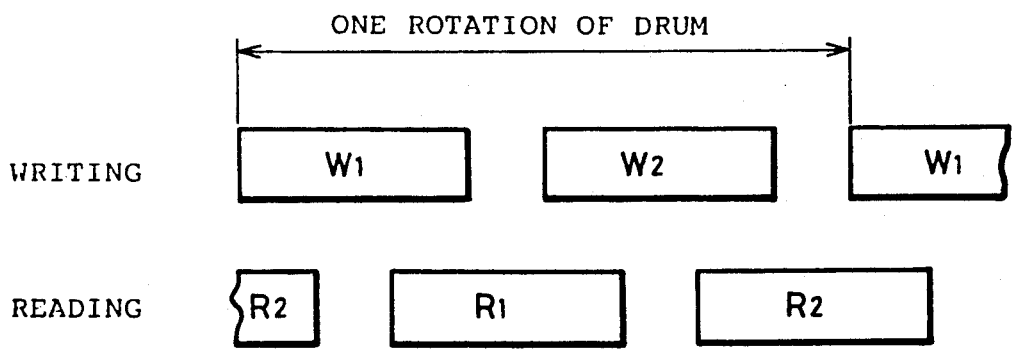
FIG. 7 is a diagram showing timings of writing onto and reading from a magnetic tape performed by a rotating drum of a reduced diameter.

As described above, with the rotating drum 90 of a small diameter, the contact angle of the magnetic tape becomes 90° or larger. Therefore, if the writing and reading is to be done by four heads during a single rotation of the rotating drum 90, there will arise an overlap between the writing time and the reading time (see FIG. 7), causing crosstalk. Hence, according to the present embodiment, writings by the writing heads W1 and W2, and readings by the reading head R1 and R2 are performed once by each, during two rotations of the rotating drum 90. For this purpose, arrangement of the respective magnetic heads has been changed when compared with that of the conventional case shown in FIG. 1. Now, as shown in FIG. 8, assuming that a horizontal angle spanned between the writing head W1 and the corresponding reading head R1 with respect to the central axis of the rotating drum 90 is $\theta 1$, a horizontal angle spanned alike between the reading head R1 and the writing head W2 is $\theta 2$ and a horizontal angle spanned alike between the writing head W2 and the corresponding reading head R2 is $\theta 3$, the respective magnetic heads are arranged to meet the following conditions.

Figure 1:
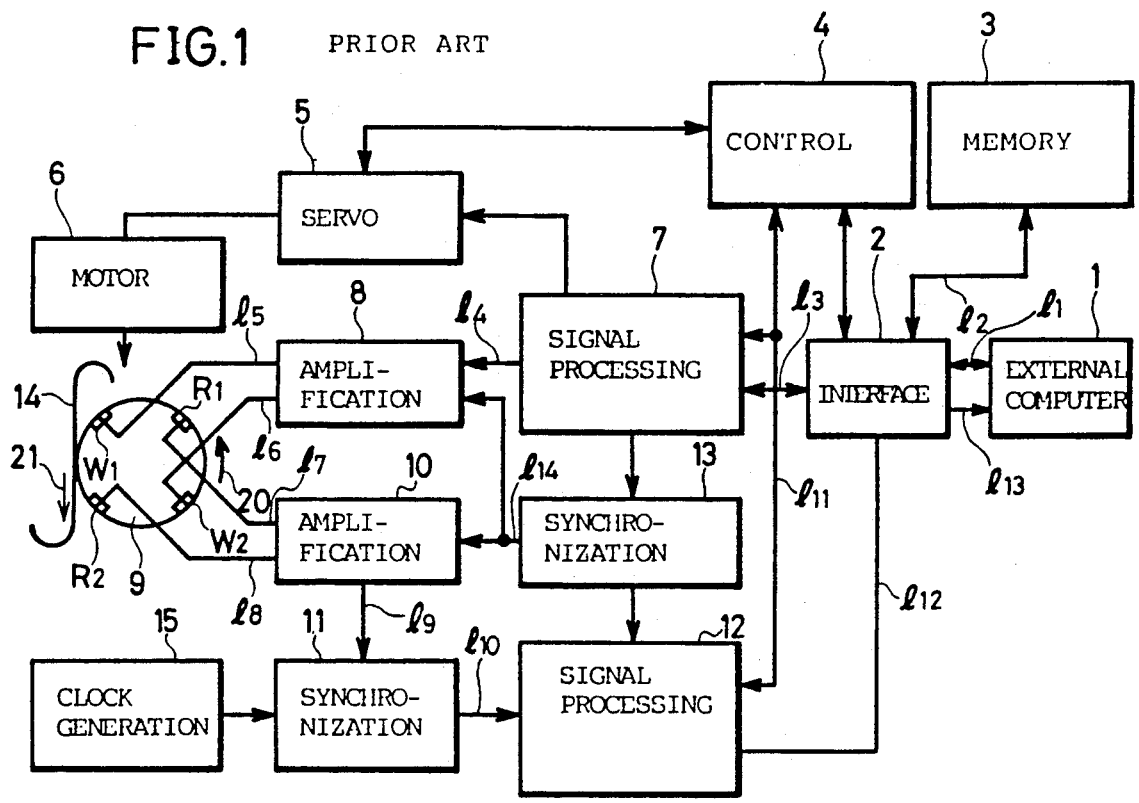
FIG. 1 is a schematic block diagram showing an example of a conventional R-DAT.
Figure 2:
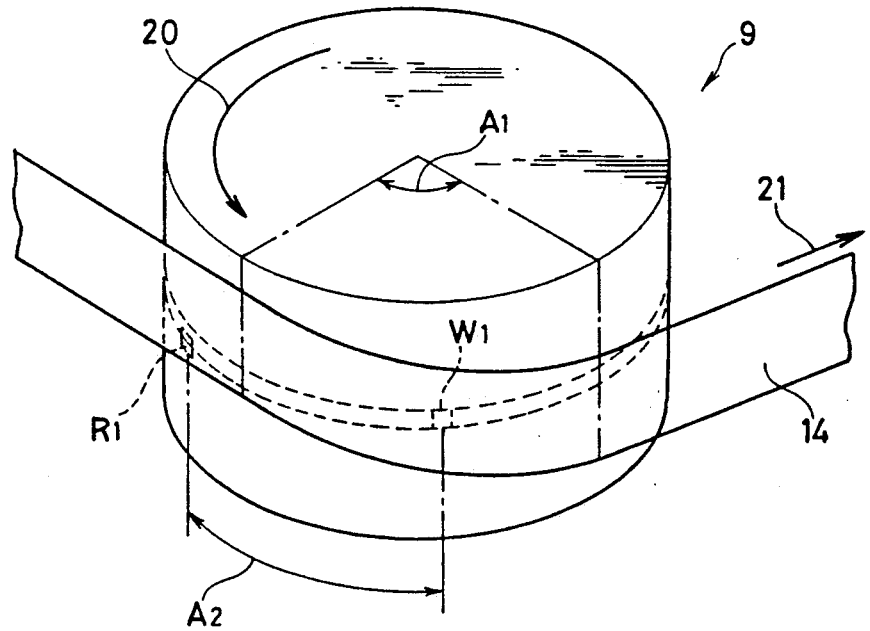
FIG. 2 is a perspective view showing a structure of a rotating drum and other parts associated therewith in the conventional R-DAT.
Figure 3A:
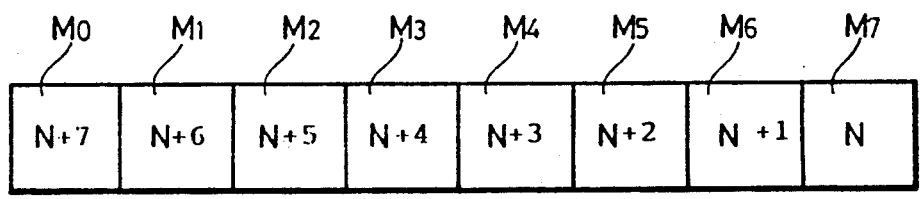
FIG. 3(a–e) is a drawing showing memory areas of the memory 3 shown in FIG. 1, and their transit states.
Figure 3B:
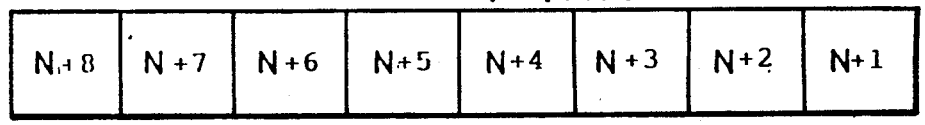
Figure 3C:
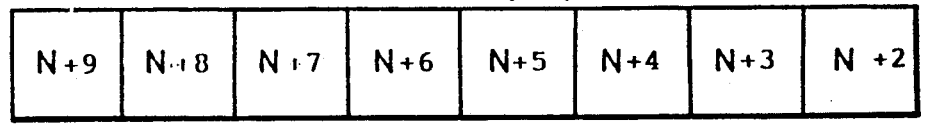
Figure 3D:
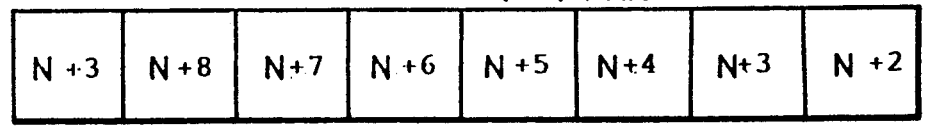
Figure 3E:
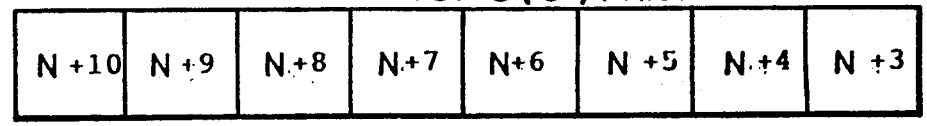
Figure 4:
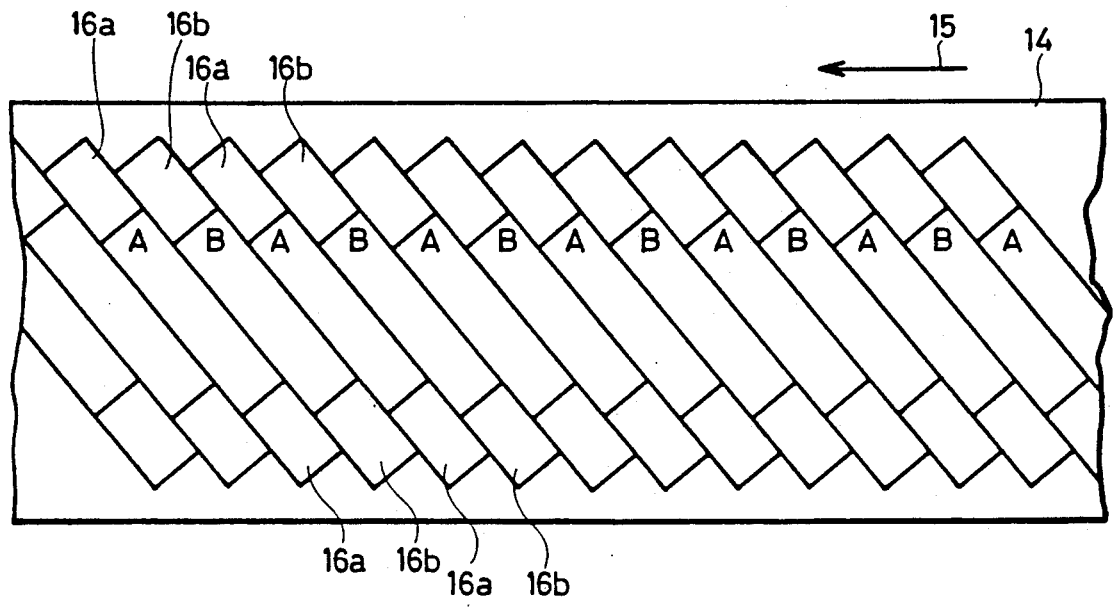
FIG. 4 is a diagram showing a format of a record track formed on a magnetic tape.
Figure 5:
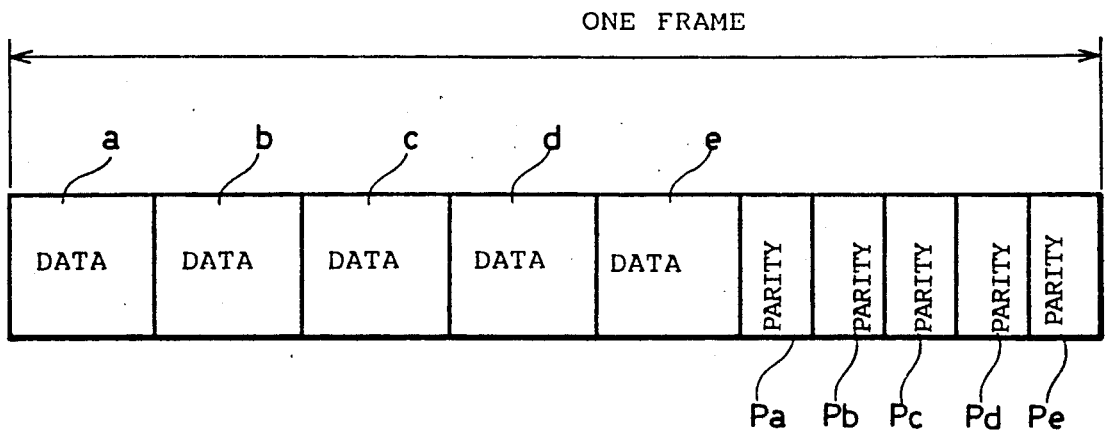
FIG. 5 is a diagram showing composition of one frame data employed in an R-DAT.
Figure 6:
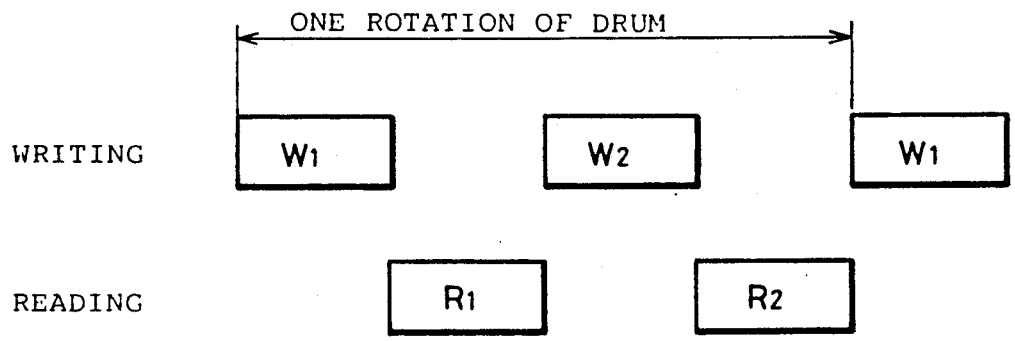
FIG. 6 is a diagram showing timings of data writing and reading performed by the conventional apparatus shown in FIG. 1.

$\alpha \leq \theta 1, \alpha \leq \theta 2, \alpha < \theta 3$ $\theta 1 + \theta 2 + \theta 3 \leq 720° - \alpha \theta 2 \neq 180°$ Meanwhile, other structure is the same as that of the conventional R-DAT shown in FIG. 1.

Figure 9:
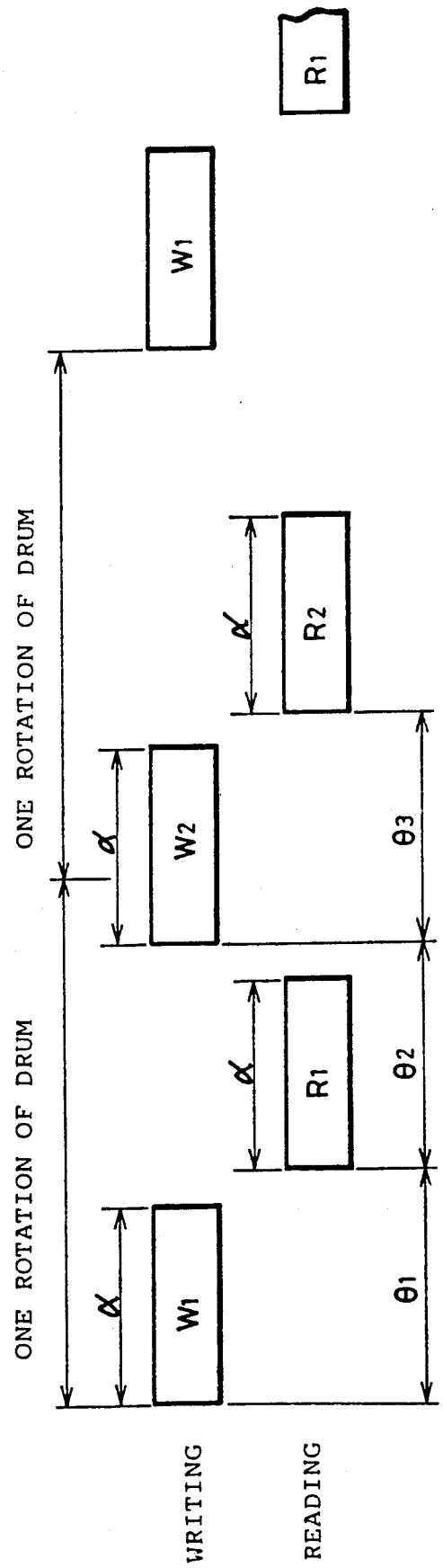
FIG. 9 is a diagram showing timings of writing and reading according to an embodiment of the present invention.

When writing and reading on a magnetic tape is performed with the writing heads W1 and W2, and the reading heads R1 and R2 arranged to meet the conditions described above, timings of the writing and reading by those magnetic heads will be as shown in FIG. 9. As will be apparent from FIG. 9, there can not be seen any overlap between the writing time of the writing heads and the reading time of the reading heads. Therefore, the crosstalk which has occurred in the conventional R-DAT can be prevented.

While in the embodiment above, the writings by the writing heads W1 and W2, and the readings by the reading heads R1 and R2 are performed during two rotations of the rotating drum 90, they may be done during three or more rotations. In such a case, arrangement conditions for the respective magnetic heads will be as follows;

$$\alpha \leq \theta_1, \alpha \leq \theta_2, \alpha \leq \theta_3$$

$$\theta_1 + \theta_2 + \theta_3 \leq 360° \, n - \alpha$$

$$\theta_2 \neq 180°,$$

where n is integer of 2 or larger.

Furthermore, in the embodiment above, since the operation which has been hitherto performed with a single rotation of the rotating drum is done with two rotations of the same, an unchanged read angle of the magnetic tape with respect to the rotating drum will cause a little change in the track angle on the magnetic tape. Therefore, in order to enable scanning on the track with the conventional track angle unchanged, the read angle should be preferably changed in providing the magnetic tape on the rotating drum.

As has been described in the foregoing, according to the present invention, since the reading operation can be performed after completion of the writing operation, generation of the crosstalk can be prevented.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic storage apparatus for avoiding overlapping of tracing periods of first and second write only magnetic heads and first and second read only magnetic heads of the storage apparatus during operation comprising:

a rotating drum which has a central axis and which has a periphery, contacted by a magnetic tape at a predetermined contact angle $\alpha$ of a value greater than 90°;

said periphery of said rotating drum having located thereon said first and second write only magnetic heads and said first and second read only magnetic heads, the first and second write only magnetic heads and the first and second read only magnetic heads contacting the tape during operation of the apparatus, wherein a relation between locations of the first and second write only magnetic heads and the first and second read only magnetic heads, is defined with the angle $\alpha$ as:

$$\theta_1 \geq \alpha$$

$$\theta_2 \geq \alpha$$

$$\theta_3 \geq \alpha$$

$$\theta_1 + \theta_2 + \theta_3 \leq 360° \times n - \alpha$$

where n: represents a positive integer representing how many rotating of the drum are required of processing one frame, $\theta_1$: a horizontal angle spanned between the first write only magnetic head and the first read only magnetic head with respect to the central axis of the rotating drum, $\theta_2$: a horizontal angle spanned between the first read only magnetic head and the second write only magnetic head with respect to the central axis of the rotating drum and $\theta_3$: a horizontal angle spanned between the second write only magnetic head and the second read only magnetic head with respect to the central axis of the rotating drum are given;

wherein the values of $\theta_1$, $\theta_2$, $\theta_3$ and n are calculated based of a value of contact angle $\alpha$ greater than 90°.

2. The magnetic storage apparatus according to claim 1, wherein n rotations of said rotating drum allow the first and second write only magnetic heads to write and the first and second read only magnetic head to read, so that writing and reading is performed once for each.

3. The magnetic storage apparatus of claim 1 herein the rotating drum has a diameter less than 30mm, so that the apparatus can be effectively used with respect to R-DAT format.

4. The magnetic storage apparatus of claim 1 wherein there are only two write only magnetic heads and two read only magnetic heads located on the periphery on said rotating drum.

5. The magnetic storage apparatus of claim 1, wherein the positive integer n is at least 2 or larger.

* * * * *